United States Patent
Pilati et al.

(10) Patent No.: US 8,194,878 B2
(45) Date of Patent: *Jun. 5, 2012

(54) DUAL STREAMING WITH EXCHANGE OF FEC STREAMS BY AUDIO SINKS

(75) Inventors: Laurent Pilati, Antibes (FR); Mickael Jougit, Mougins le Haut (FR)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/227,710

(22) Filed: Sep. 8, 2011

(65) Prior Publication Data

US 2011/0320214 A1    Dec. 29, 2011

Related U.S. Application Data

(63) Continuation of application No. 12/053,743, filed on Mar. 24, 2008, now Pat. No. 8,041,051.

(51) Int. Cl.
*H04B 5/00* (2006.01)
*H04B 3/00* (2006.01)

(52) U.S. Cl. ........... 381/79; 381/17; 381/18; 381/22; 381/26; 381/80; 381/309; 381/311; 379/67.1; 379/78; 379/353; 379/357.01; 455/575.2

(58) Field of Classification Search .......... 381/17, 381/18, 22, 26, 79, 80, 309, 311; 379/67.1, 379/78, 353, 357.01; 455/575.2
See application file for complete search history.

(56) References Cited

U.S. PATENT DOCUMENTS

| 7,805,210 | B2 | 9/2010 | Cucos et al. |
| 8,041,051 | B2 * | 10/2011 | Pilati et al. .................. 381/79 |
| 2007/0149261 | A1 * | 6/2007 | Huddart .................. 455/575.2 |
| 2008/0076489 | A1 * | 3/2008 | Rosener et al. ............ 455/575.2 |
| 2008/0226094 | A1 * | 9/2008 | Rutschman .................. 381/79 |
| 2009/0238375 | A1 | 9/2009 | Pilati et al. |

OTHER PUBLICATIONS

"Audio/Video Distribution Transport Protocol (AVDTP) Specification", Bluetooth Audio Video Working Group, Version 1.00, Bluetooth Special Interest Group, Inc., May 22, 2003, 145 Pages.
Rosenburg et al., "An RTP Payload Format for Generic Forward Error Correction", Internet Engineering Task Force, (IETF) Request for Comments (RFC) 2733, Dec. 1999, 27 pages.

\* cited by examiner

*Primary Examiner* — Dao H Nguyen
(74) *Attorney, Agent, or Firm* — Fiala & Weaver P.L.L.C.

(57) ABSTRACT

A system and method is described herein in which an audio source wirelessly transmits audio content to a first audio sink over one wireless link and to a second audio sink over another wireless link. The two audio sinks also exchange forward error correction (FEC) streams over a link between the two audio sinks, wherein the FEC streams are generated by FEC encoding the audio content received from the audio source. The audio sinks advantageously use the exchanged FEC information to synchronize the playback of the audio content as well as to improve the robustness of the wireless links with the audio source in a manner that does not consume additional bandwidth on those links.

21 Claims, 9 Drawing Sheets

DUAL STREAMING WITH EXCHANGE OF FEC STREAMS BY AUDIO SINKS

CROSS-REFERENCE TO RELATED APPLICATIONS

This application is a continuation of U.S. patent application Ser. No. 12/053,743, filed Mar. 24, 2008, the entirety of which is incorporated by reference herein.

BACKGROUND OF THE INVENTION

1. Field of the Invention

The invention generally relates to systems in which audio content is transmitted between entities. In particular, the invention relates to systems in which audio content is wirelessly delivered from a single audio source to two audio sinks.

2. Background

In the past, telephone communication and the consumption of media content required a user to be stationary, since the electronic devices and systems that enabled such activities were themselves stationary. However, with advances in mobile technology, telephone users and media consumers have become mobile as well. The use of cellular telephones for mobile communication has become ubiquitous. Additionally, a wide variety of portable electronic devices are now available that can be used to store or access media content for playback at virtually any location. Such devices include but are not limited to portable media players, handheld computing devices, laptop computers and media-enabled cellular telephones.

To meet the demands of mobility, the speakers associated with such cellular telephones and portable electronic devices are often small and designed to operate using little power. This places constraints on the loudness and quality of the audio that can be produced by such devices. Additionally, some portable electronic devices have no speakers at all, but instead require the use of headphones to listen to audio content. Users may also choose to use headphones with devices that do have a speaker (such as cellular telephones) to enhance their perception of the audio content, to free up their hands, and/or to prevent others from hearing the audio. In any case, if the headphones are wired, then the user must be physically tethered to the device, which can be inconvenient and/or uncomfortable.

To address these issues, technology has been developed that allows cellular telephones and other portable electronic devices to form wireless links with external speaker systems so that the portable electronic devices can deliver audio content over the external systems. Examples of such external speaker systems include wireless headphones and headsets, stand-alone wireless speakers, or speakers integrated within other electronic devices or systems that are adapted to receive audio wirelessly. Protocols that can be used to enable the wireless streaming of audio to such systems include but are not limited to the well-known protocols for short-range wireless communication defined in the Bluetooth™ specifications (developed and licensed by the Bluetooth™ Special Interest Group) and the well-known protocols for wireless local area network (WLAN) communication defined in the various IEEE 802.11 standards (developed by the IEEE LAN/MAN Standards Committee).

One type of external speaker system to which audio content may be delivered wirelessly is a stereo speaker system that includes a left-channel speaker and a right-channel speaker. A conventional approach to wirelessly delivering audio content to such a system is depicted in FIG. 1. In particular, FIG. 1 is a block diagram of a conventional system 100 in which an audio source 102 wirelessly delivers audio content to a first audio sink 104 and a second audio sink 106, wherein the audio sinks are connected by a wired link 110. First audio sink 104 and second audio sink 106 are intended to represent audio speakers, or devices that contain such speakers. In system 100, audio source 102 transmits an audio stream 112 over a wireless link 108 to first audio sink 104. First audio sink 104 receives the audio stream and extracts two channels of audio content therefrom—namely, a left audio channel and a right audio channel. One channel is played back by first audio sink 104, while the other channel is transmitted over wired link 110 for playback by second audio sink 106.

In the approach shown in FIG. 1, the respective playback of each of the two channels of audio content by first audio sink 104 and second audio sink 106 can be highly synchronized since first audio sink 104 manages both channels of audio content and the delivery of audio content from first audio sink 104 to second audio sink 106 takes place over a wired transmission medium. Furthermore, the quality of the audio produced by second audio sink 106 will likely be as good as the quality of the audio produced by first audio sink 104 since little or no packet loss is expected over wired link 110. However, the approach shown in FIG. 1 is limiting because it requires that first audio sink 104 and second audio sink 106 be physically connected to each other by wired link 110. This limits the placement and mobility of each of the audio sinks. Furthermore, this prevents audio source 102 from establishing ad hoc links with two speakers that are not part of the same speaker system.

Another conventional approach to wirelessly delivering audio content to a stereo speaker system is depicted in FIG. 2. In particular, FIG. 2 is a block diagram of a conventional system 200 in which an audio source 202 wirelessly delivers audio content to a first audio sink 204 and a second audio sink 206, wherein the audio sinks are communicatively connected to each other via a wireless link 210. In system 200, audio source 202 transmits a first audio stream 212 over a wireless link 208 to first audio sink 204. First audio sink 204 receives first audio stream 212 and extracts two channels of audio content therefrom. One channel is played back by first audio sink 204, while the other channel is transmitted to second audio sink 206 as part of a second audio stream 214 transmitted over wireless link 210. Second audio sink 206 receives the second audio stream 214 and extracts the other channel of audio content for playback.

The approach shown in FIG. 2 is advantageous in that it does not require a wired link between first audio sink 204 and second audio sink 206. However, this approach also suffers from some drawbacks. For example, in the approach shown in FIG. 2, if wireless link 208 between audio source 202 and first audio sink 204 is degraded for any reason, then the quality of the audio produced by both first audio sink 204 and second audio sink 206 will suffer. Furthermore, if wireless link 210 between first audio sink 204 and second audio sink 206 is degraded for any reason, then the quality of the audio produced by second audio sink 206 will suffer.

Accordingly, what is needed is an approach to delivering audio content from a single audio source to two audio sinks that addresses the foregoing shortcomings associated with conventional solutions.

BRIEF SUMMARY OF THE INVENTION

A system and method is described herein in which an audio source wirelessly transmits audio content to a first audio sink over one wireless link and to a second audio sink over another wireless link. The two audio sinks also exchange forward error correction (FEC) streams over a link between the two audio sinks, wherein the FEC streams are generated by FEC encoding the audio content received from the audio source. The audio sinks advantageously use the exchanged FEC information to synchronize the playback of the audio content as well as to improve the robustness of the wireless links with the audio source in a manner that does not consume additional bandwidth on those links.

In particular, a method for processing audio content for playback in a first audio sink is described herein. In accordance with the method, one or more packets are received from an audio source over a first wireless link. An FEC packet is received from a second audio sink. The second audio sink generated the received FEC packet by FEC encoding a plurality of audio packets received from the audio source over a second wireless link. A lost audio packet is then recovered based on the one or more received audio packets and the received FEC packet. The one or more received audio packets and the recovered audio packet are then decoded for playback.

The foregoing method may further include a number of additional steps. In accordance with these additional steps, a plurality of audio packets is received from the audio source over the first wireless link. FEC encoding is performed on the received plurality of audio packets to generate an FEC packet. The generated FEC packet is then transmitted to the second audio sink.

The foregoing method may also include analyzing the received FEC packet to estimate a buffering drift associated with audio content played back by the first audio sink and the second audio sink and synchronizing the playback of audio content by the first audio sink based on the analysis.

An audio sink is also described herein. The audio sink includes an interface, recovery logic communicatively connected to the interface and audio decoding logic communicatively connected to the recovery logic. The interface is configured to receive one or more audio packets from an audio source over a first wireless link and to receive an FEC packet from another audio sink, wherein the other audio sink generated the received FEC packet by encoding a plurality of audio packets received from the audio source over a second wireless link. The recovery logic is configured to recover a lost audio packet based on the one or more received audio packets and the received FEC packet. The audio decoding logic is configured to decode the one or more received audio packets and the recovered audio packet for playback.

In one implementation of the audio sink, the interface is further configured to receive a plurality of audio packets from the audio source over the first wireless link, the recovery logic is further configured to perform FEC encoding on the received plurality of audio packets to generate an FEC packet, and the interface is still further configured to transmit the generated FEC packet to the other audio sink.

The audio sink may further include synchronization logic communicatively connected to the recovery logic and the decoding logic. The synchronization logic is configured to analyze the received FEC packet to estimate a buffering drift associated with audio content played back by the audio sink and the other audio sink and to synchronize the playback of audio content by the audio sink based on the analysis.

A system is also described herein. The system includes a first audio sink and a second audio sink. The first audio sink is configured to receive a plurality of audio packets from an audio source over a first wireless link, to perform FEC encoding on the plurality of audio packets to generate an FEC packet, to transmit the FEC packet nk, and to decode the plurality of audio packets for playback. The second audio sink is configured to receive one or more packets from the audio source over a second wireless link, to receive the FEC packet, to recover a lost audio packet based on the one or more packets received from the audio source and the FEC packet, and to decode the one or more audio packets received from the audio source and the recovered audio packet for playback.

The second audio sink may also be configured to analyze the FEC packet to estimate a buffering drift associated with audio content played back by the first audio sink and the second audio sink and to synchronize the playback of audio content based on the analysis.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
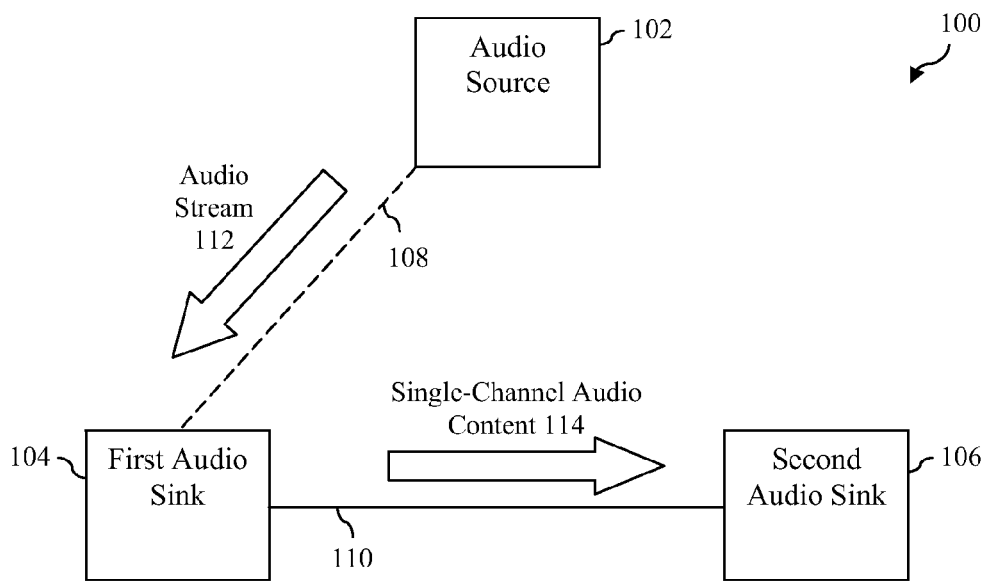
FIG. 1 is a block diagram of a conventional system in which an audio source wirelessly delivers audio content to a first audio sink and a second audio sink.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

Figure 3:
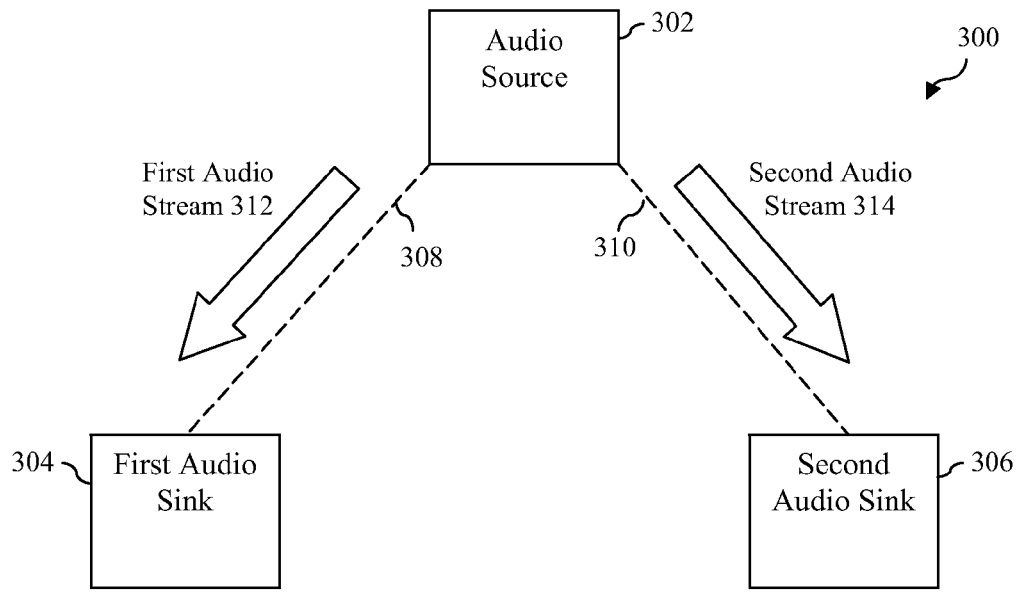
FIG. 3 is a block diagram of a system in which an audio source wirelessly transmits an audio stream to each of a first audio sink and a second audio sink.

An embodiment of the present invention utilizes dual streaming to delivery audio content from a single audio source to two audio sinks. The concept of dual streaming will now be described in reference to an example system 300 of FIG. 3. In system 300, an audio source 302 wirelessly delivers audio content to a first audio sink 304 and a second audio sink 306. To achieve this, audio source 302 transmits a first audio stream 312 over a first wireless link 308 to first audio sink 304 and transmits a second audio stream 314 over a second wireless link 310 to second audio sink 306. The transmission of two audio streams in this manner is referred to generally herein as "dual streaming." First audio stream 312 and second audio stream 314 each carry copies of the same audio content generated by audio source 302. In this example, it is assumed that this audio content includes right-channel audio content and left-channel audio content.

First audio sink 304 receives first audio stream 312 and extracts audio content associated with one of the two channels therefrom (i.e., either right-channel audio content or left-channel audio content). Second audio sink 304 receives second audio stream 314 and extracts audio content associated with the other audio channel therefrom. Each audio sink then plays back the respective extracted audio content.

This dual streaming approach to delivering audio content from a single audio source to two audio sinks provides some distinct advantages over other approaches described herein. For example, as compared to the conventional approach described above in reference to system 100 of FIG. 1, system 300 of FIG. 3 does not require a wired connection between first audio sink 304 and second audio sink 306. This allows for greater flexibility in regard to the placement and mobility of each of the audio sinks. Furthermore, this allows audio source 302 to establish ad hoc links with two audio sinks that are not part of the same speaker system.

Figure 2:
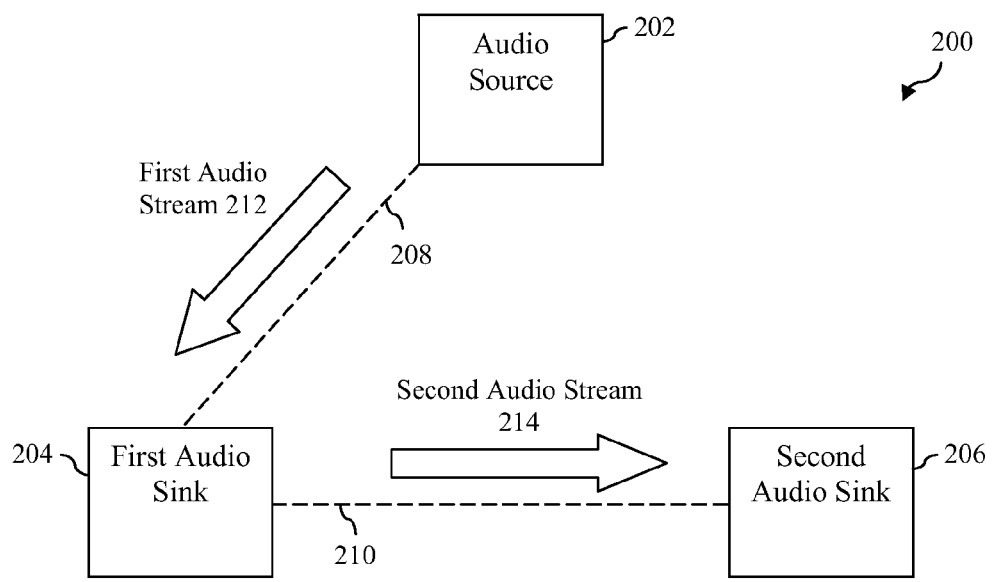
FIG. 2 is a block diagram of another conventional system in which an audio source wirelessly delivers audio content to a first audio sink and a second audio sink.

As compared to the conventional approach described above in reference to system 200 of FIG. 2, the quality of the audio produced by both first audio sink 304 and second audio sink 306 is not dependent upon the condition of a single wireless link between audio source 302 and first audio sink 304. Furthermore, the quality of the audio produced by second audio sink 306 is not dependent upon the condition of a wireless link between first audio sink 304 and second audio sink 306.

However, the use of dual streaming in the manner described above in reference to system 300 poses some serious challenges. For example, in order to provide a high-quality audio experience, system 300 must ensure that the playback of audio content by first audio sink 304 and second audio sink 306 is synchronized. In other words, any buffering drift between first audio sink 304 and second audio sink 306 must be minimized. This is difficult to achieve because audio source 302 communicates with first audio sink 304 and second audio sink 306 over different wireless links, each of which may support different bit rates that may vary over time. Also, if audio sink 304 and audio sink 306 are not of an identical design, each device may use a different buffering scheme. Furthermore, in order to provide a high-quality audio experience, system 300 must ensure that both wireless link 308 and wireless link 310 are robust so that the quality of the audio produced by both audio sinks will not suffer.

Figure 4:
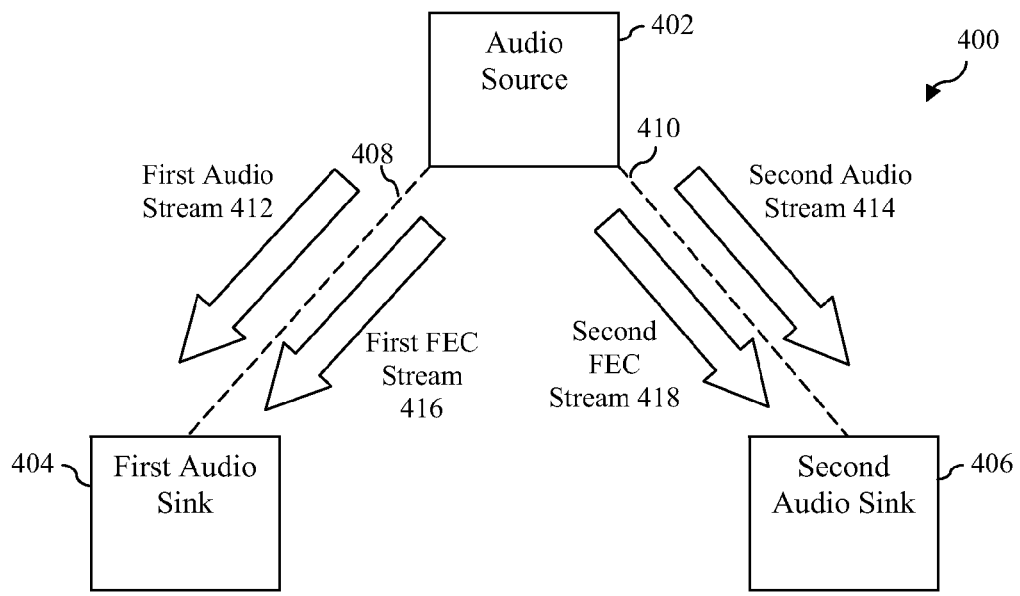
FIG. 4 is a block diagram of a system in which an audio source wirelessly transmits an audio stream and a forward error correction (FEC) stream to each of a first audio sink and a second audio sink.

FIG. 4 is a block diagram of a system 400 that also uses dual streaming to wirelessly deliver audio content from an audio source 402 to a first audio sink 404 and a second audio sink 406. System 400 is different from system 300 in that audio source 402 also transmits forward error correction (FEC) information to each audio sink. In particular, audio source 402 transmits a first audio stream 412 and a first FEC stream 416 associated therewith to first audio sink 404 over a first wireless link 408 and transmits a second audio stream 414 and a second FEC stream 418 associated therewith to second audio sink 406 over a second wireless link. First audio sink 404 can advantageously use the information provided in first FEC stream 416 to replace lost audio information in first audio stream 412 and second audio sink 406 can advantageously use the information provided in second FEC stream 418 to replace lost audio information in second audio stream 414.

Thus, the transmission of the additional FEC streams by audio source 402 in system 400 can help to maintain the robustness of wireless link 408 and wireless link 410 even when such links become degraded due to interference, distance between source and sink, or the like. However, the transmission of the additional FEC streams also further consumes bandwidth on critical wireless links 408 and 410 between audio source 402 and audio sinks 404 and 406 respectively. Additionally, the transmission of the additional FEC streams by audio source 402 does nothing to address the issue of synchronization between first audio sink 404 and second audio sink 406, the importance of which was discussed above.

Figure 5:
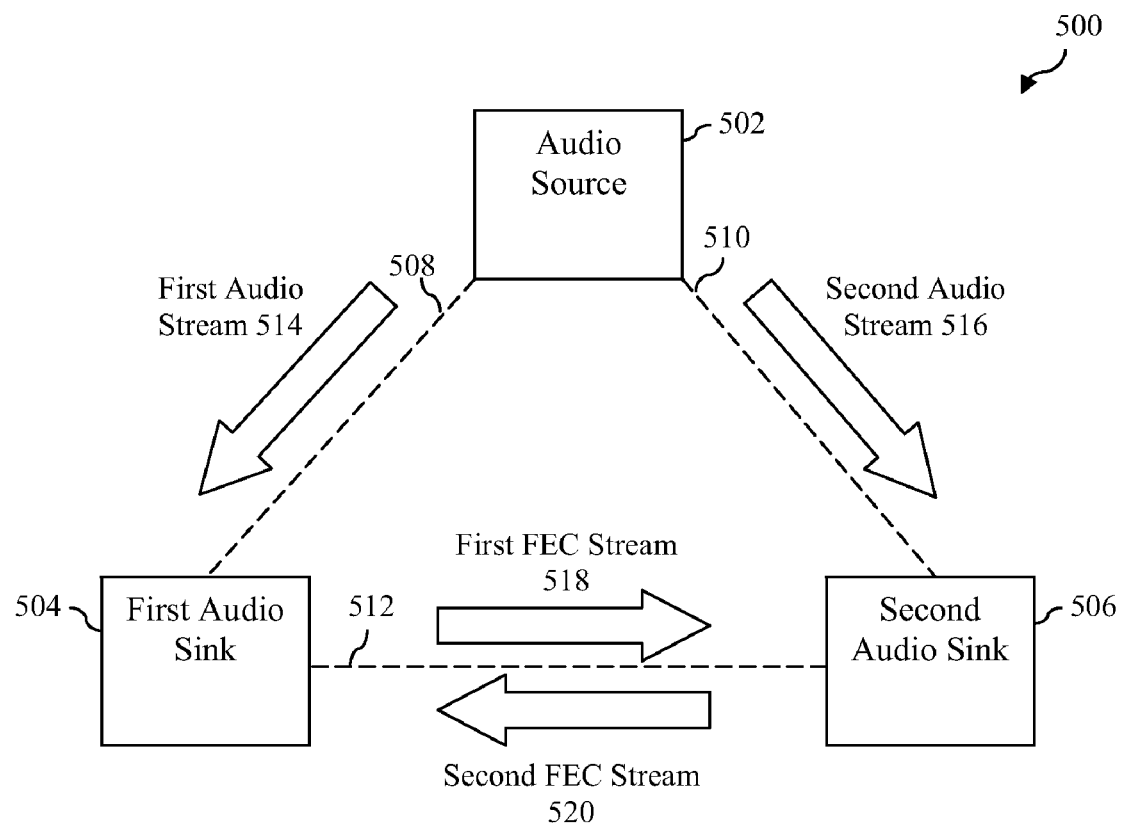
FIG. 5 is a block diagram of a system in accordance with an embodiment of the present invention in which an audio source wirelessly transmits an audio stream to each of a first audio sink and a second audio sink and in which the audio sinks wirelessly exchange FEC streams.

B. Dual Streaming with Exchange of FEC Streams by Audio Sinks in Accordance with an Embodiment of the Present Invention FIG. 5 depicts an example system 500 in accordance with an embodiment of the present invention that uses dual streaming to wirelessly deliver audio content from an audio source 502 to a first audio sink 504 and a second audio sink 506. As shown in FIG. 5, system 500 also implements an exchange of FEC streams between first audio sink 504 and second audio sink 506. As will be explained in more detail below, this exchange of FEC information can advantageously be used to synchronize the playback of audio content by audio sink 504 and audio sink 506 as well as to improve the robustness of the critical wireless links between audio source 502 and each of audio sinks 504 and 506 in a manner that does not consume additional bandwidth on those links.

System 500 will now be described in more detail. For the purposes of this description, it will be assumed that each of audio source 502, first audio sink 504 and second audio sink 506 are Bluetooth™-enabled devices and that the wireless links formed between these devices are formed and maintained in accordance with protocols set forth in the Bluetooth™ specifications. For example, audio source 502 may comprise any Bluetooth™-enabled device that is capable of generating audio content including but not limited to a Bluetooth™-enabled cellular phone, portable media player, handheld computing device or laptop computer. Also by way of example, first audio sink 504 and second audio sink 506 may each comprise a Bluetooth™-enabled speaker, wherein each speaker is either a stand-alone speaker or an integrated part of another electronic device or system, such as a television, stereo headset, or the like. It is noted that audio sink 504 and audio sink 506 need not be part of the same speaker system or be designed by the same manufacturer, so long as each component is configured to perform in a manner described below.

Audio source 502 is configured to generate audio information in the form of audio packets and to transport those audio packets over a Bluetooth™-wireless link in accordance with the Bluetooth™ Audio/Video Distribution Transport Protocol (AVDTP). AVDTP is fully described in the AVDTP Specification (Version 1.0, released May 22, 2003)(referred to herein as "the AVDTP Specification"), which is published by the Bluetooth™ Special Interest Group and is incorporated by reference as if fully set forth herein. As will be appreciated by persons skilled in the relevant art(s), AVDTP applies point-to-point signaling over a connection-oriented L2CAP (Logical Link Control and Adaptation Protocol) channel. The L2CAP channel is set up in advance between audio source 502 and another device participating in audio/video (A/V) stream data distribution. The audio packets include both left-channel and right-channel audio information.

As shown in FIG. 5, audio source 502 is configured to transmit a first copy of the audio packets to first audio sink 504 in the form of a first audio stream 514 over a Bluetooth™ wireless link 508 and to transmit a second copy of the audio packets to second audio sink 506 in the form of a second audio stream 516 over a Bluetooth™ wireless link 510. Each audio stream 514 and 516 is an instance of a Bluetooth™ A/V stream and as such, represents a logical end-to-end connection of streaming audio data between audio source 502 and a corresponding one of audio sinks 504 and 506.

First audio sink 504 is configured to receive the audio packets within first audio stream 514 and to extract audio content associated with one of the two channels therefrom (i.e., either right-channel audio content or left-channel audio content) for subsequent decoding and playback. First audio sink 504 is also configured to apply an FEC scheme to the received audio packets within first audio stream 514 to generate a series of FEC packets and to transmit the FEC packets as part of a first FEC stream 518 to second audio sink 506 over a Bluetooth™ wireless link 512.

Second audio sink 506 is configured to receive the audio packets within second audio stream 516 and to extract audio content associated with the other of the two channels therefrom for subsequent decoding and playback. Second audio sink 506 is also configured to apply an FEC scheme to the received audio packets within second audio stream 516 to generate a series of FEC packets and to transmit the FEC packets as part of a second FEC stream 520 to first audio sink 504 over Bluetooth™ wireless link 512.

First audio sink 504 is configured to use the FEC packets included in second FEC stream 520 to recover lost audio packets in first audio stream 514. Likewise, second audio sink 506 is configured to use the FEC packets in first FEC stream 518 to recover lost audio packets in second audio stream 516. This is possible because the underlying audio packets used by both first audio sink 504 and second audio sink 506 for generating FEC packets are essentially the same. The manner in which FEC packets are generated and used to recover lost packets by first audio sink 504 and second audio sink 506 will be described in more detail below.

First audio sink 504 is also configured to use the FEC packets included in second FEC stream 520 to synchronize the playback of audio content obtained from first audio stream 514 with the playback of audio content obtained from second audio stream 516 by second audio sink 506. First audio sink 504 is able to perform this function because the FEC packets in second FEC stream 520 carry time stamps associated with the audio packets from second audio stream 516 used to generate them. By analyzing these time stamps, first audio sink 504 is capable of determining whether the audio content currently being played back by second audio sink 506 has drifted ahead or fallen behind of the playback of audio content by first audio sink 504 and to adjust accordingly. Likewise, second audio sink 506 is also configured to use the FEC packets included in first FEC stream 518 to synchronize the playback of audio content obtained from second audio stream 516 with the playback of audio content obtained from first audio stream 514 by first audio sink 504. The manner in which first audio sink 504 and second audio sink 506 use the FEC packets from second FEC stream 520 and first FEC stream 518, respectively, to perform synchronization operations will be described in more detail below.

The approach to delivering audio content from a single audio source to two audio sinks represented by system 500 of FIG. 5 thus provides a mechanism for synchronizing playback between the audio sinks that was not provided by dual streaming system 300 described above in reference to FIG. 3 or dual streaming system 400 described above in reference to FIG. 4.

This approach also provides a means for maintaining the robustness of wireless links 508 and 510 that does not require additional FEC streams to be sent over those links, as compared to system 400 described above in reference to FIG. 4. This helps to conserve the available bandwidth on those links for other more critical functions.

Furthermore, in system 500, the task of generating and transmitting FEC streams is respectively handled by first audio sink 504 and second audio sink 506 instead of by audio source 502. This decreases the processing burden on audio source 502, which is already required to generate and transmit first audio stream 514 and second audio stream 516. This is particularly desirable where audio source 502 is a low-power Class 2 Bluetooth™ device (defined as having a maximum permitted power of 2.5 milliwatts (mW) and a range of approximately 10 meters (m)) and audio sinks 504 and 506 are higher-power Class 1 Bluetooth™ devices (defined as having a maximum permitted power of 100 mW and a range of approximately 100 m), since the Class 1 audio sinks are less power-constrained. In such a scenario, the Class 1 audio sinks will also be much more effective at transmitting the FEC streams over longer distances than the Class 2 audio source.

The foregoing approach allows for improved audio quality in cases where audio source 502 and audio sinks 504 and 506 are located in a poor radio frequency (RF) environment. The approach is particularly effective where only one of the wireless links between audio source 502 and audio sinks 504 and 506 has become degraded. This may occur, for example, when one of the audio sinks is in close proximity to an electromagnetic source or when audio source 502 is close to passing out of range of one of the audio sinks but not the other. In this instance, the audio sink experiencing poor RF performance may still rebuild lost audio packets by consolidating audio packets received from audio source 502 with FEC packets received from the other audio sink.

Another benefit of the foregoing approach is that it would work with any audio source that is capable of performing dual streaming without requiring the implementation of any additional logic (such as FEC logic) by the audio source.

In the foregoing description, audio source 502, first audio sink 504 and second audio sink 506 are described as Bluetooth™-enabled devices capable of forming and maintaining wireless links in accordance with protocols set forth in the Bluetooth™ specifications. However, persons skilled in the relevant art(s) will readily appreciate that the present invention is not limited to a particular type of wireless device or protocol and that the concepts described herein could be implemented using a wide variety of other wireless devices or protocols. For example, WLAN devices and protocols that conform to the IEEE 802.11 standards may be used to implement the invention.

Furthermore, depending on the capabilities of audio source 502, first audio sink 504 and second audio sink 506, a mix of wireless link types may be used for communication between these devices. For example, and without limitation, Bluetooth™ protocols may be used to implement the wireless links between audio source 502 and audio sinks 504 and 506 while 802.11 protocols may be used to implement the wireless link between audio sinks 504 and 506. Conversely, 802.11 protocols may be used to implement the wireless links between audio source 502 and audio sinks 504 and 506 while Bluetooth™ protocols may be used to implement the wireless link between audio sinks 504 and 506.

C. Generation and Use of FEC Streams by Audio Sinks for Recovery of Lost Packets in Accordance with an Embodiment of the Present Invention The manner in which FEC packets are generated and used to recover lost packets by first audio sink 504 and second audio sink 506 of system 500 will now be described in more detail. To facilitate this description, a functional block diagram of an example audio sink 600 is provided in FIG. 6. Example audio sink 600 may represent either first audio sink 504 or second audio sink 506.

Figure 6:
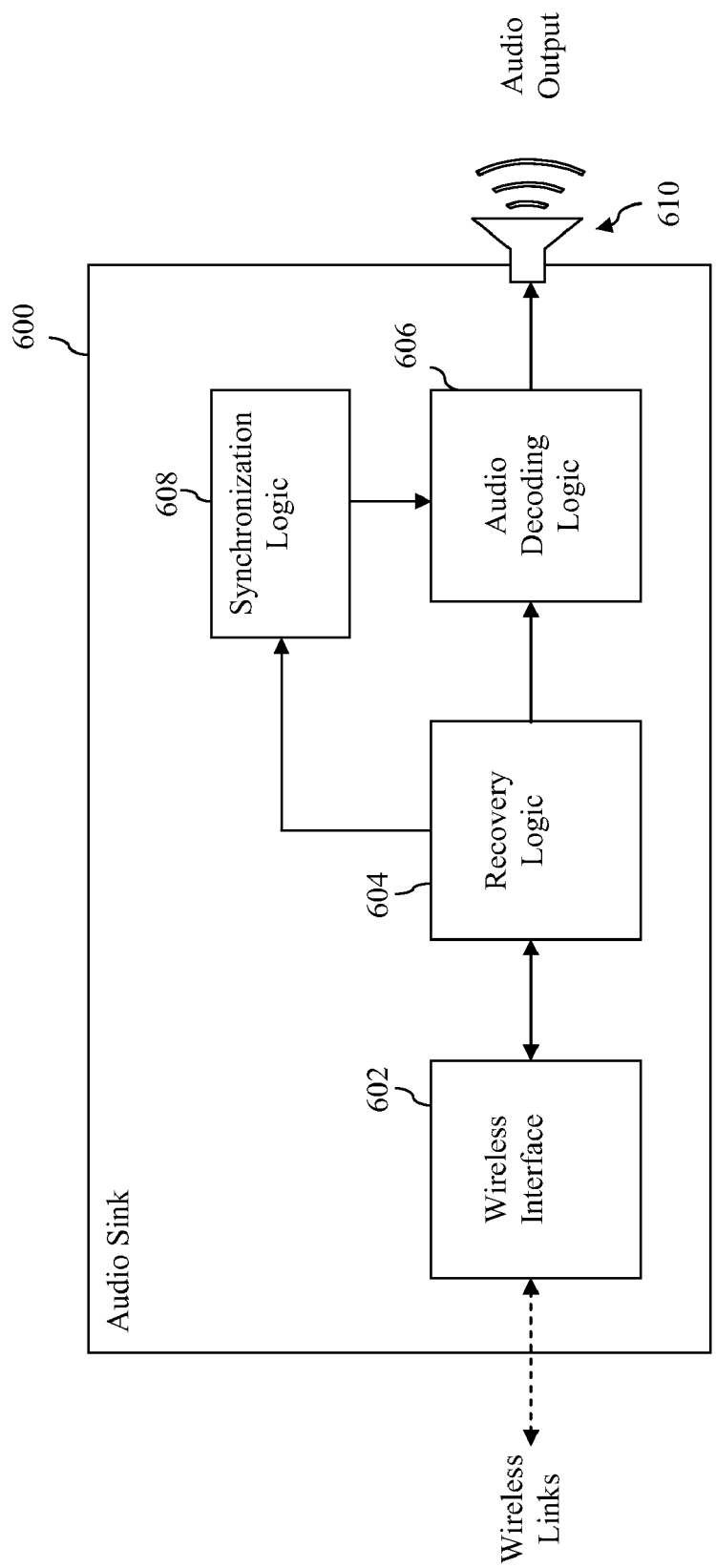
FIG. 6 is a functional block diagram of an example audio sink in accordance with an embodiment of the present invention.

As shown in FIG. 6, example audio sink 600 includes a number of communicatively connected elements including a wireless interface 602, recovery logic 604, audio decoding logic 606, synchronization logic 608 and a speaker 610. It is to be understood that, depending upon the implementation, certain of these elements may be implemented in hardware using analog and/or digital circuits, in software, through the execution of instructions by one or more general purpose or special-purpose processors, or as a combination of hardware and software. The manner in which each of these elements operates to perform features of the present invention will be described below.

Figure 7:
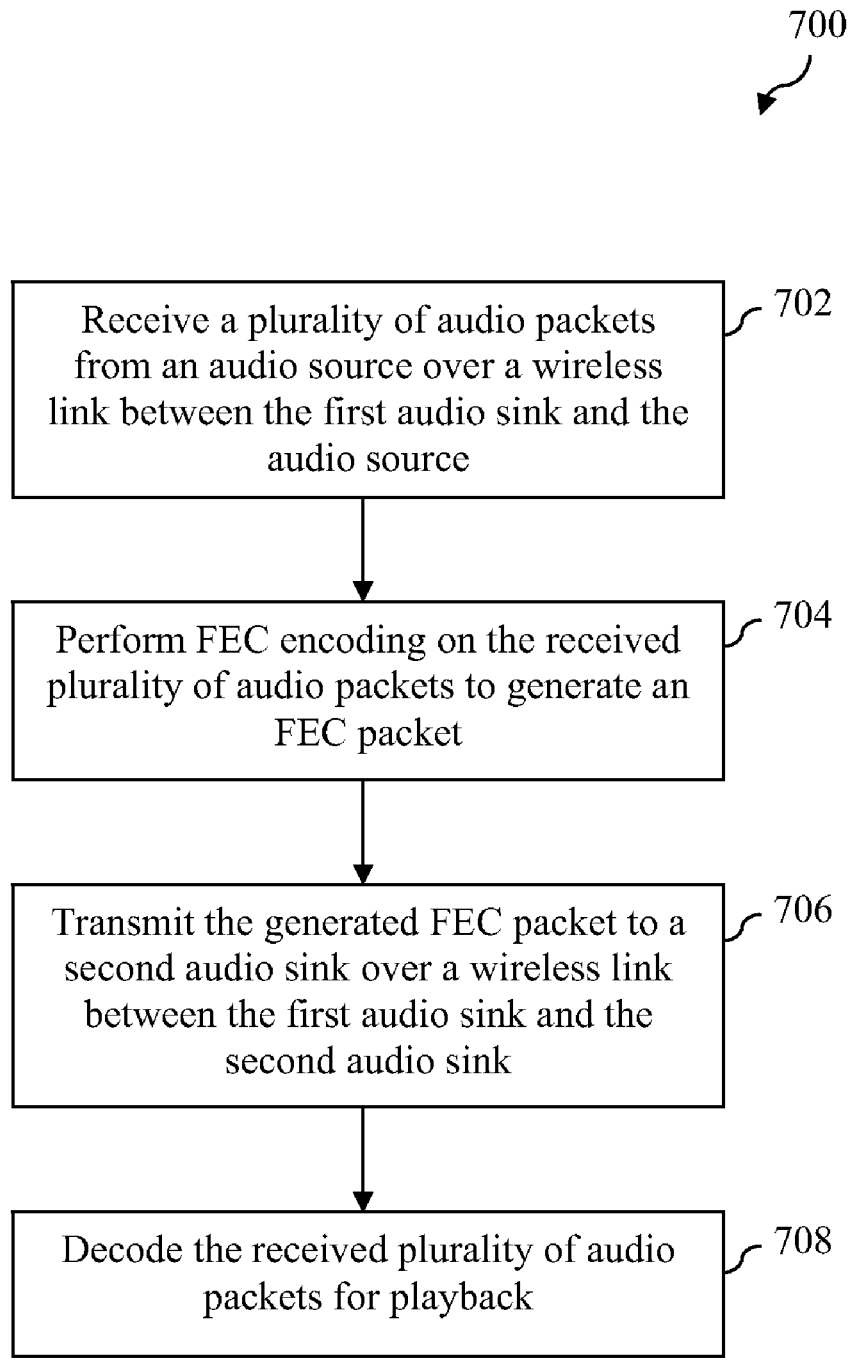
FIG. 7 depicts a flowchart of a method by which an audio sink in accordance with an embodiment of the present invention processes audio content for playback, wherein such processing includes the generation and transmission of an FEC stream to a second audio sink.

FIG. 7 depicts a flowchart of a method 700 by which audio sink 600 processes audio content for playback, wherein such processing includes the generation and transmission of an FEC stream to a second audio sink. Although the method of flowchart 700 will be described with reference to the example audio sink 600 of FIG. 6, persons skilled in the relevant art(s) will appreciate that the method is not limited to that implementation.

As shown in FIG. 7, the method of flowchart 700 begins at step 702, in which wireless interface 602 of audio sink 600 receives a plurality of audio packets from an audio source over a wireless link between audio sink 600 (referred to in the context of flowchart 700 as "the first audio sink") and the audio source. In one embodiment, the wireless link comprises a Bluetooth™ wireless link and the received audio packets comprise part of a logical end-to-end connection of streaming audio data between the audio source and audio sink 600.

At step 704, recovery logic 604 of audio sink 600 performs FEC encoding upon the received plurality of audio packets to generate an FEC packet. In an embodiment, the FEC encoding is of a type similar to that described in Section 7.4 of the AVDTP specification for performing source-to-sink FEC at the AV transport layer, which in turn is based on an FEC encoding scheme described in Internet Engineering Task Force (IETF) Request for Comments (RFC) 2733, entitled "An RTP Payload Format for Generic Forward Error Correction" (December 1999), the entirety of which is incorporate by reference herein. One example of this type of FEC encoding as applied in an embodiment of the present invention will be described below in reference to FIG. 8. However, it is noted that the invention is not limited to this particular type of FEC encoding and other types of FEC encoding known to or subsequently developed by persons skilled in the relevant art(s) may also be used.

At step 706, wireless interface 602 of audio sink 600 transmits the generated FEC packet to another audio sink (referred to in the context of flowchart 700 as "the second audio sink") over a wireless link between audio sink 600 and the other audio sink. In an embodiment, the wireless link comprises a Bluetooth™ wireless link and the generated FEC packet comprises part of a stream of FEC packets transmitted from audio sink 600 to the other audio sink.

At step 708, audio decoding logic 606 decodes the received plurality of audio packets for playback via speaker 610. Various methods for decoding the content of audio packets to generate an audio signal for playback are well-known in the art and thus need not be described herein.

Figure 8:
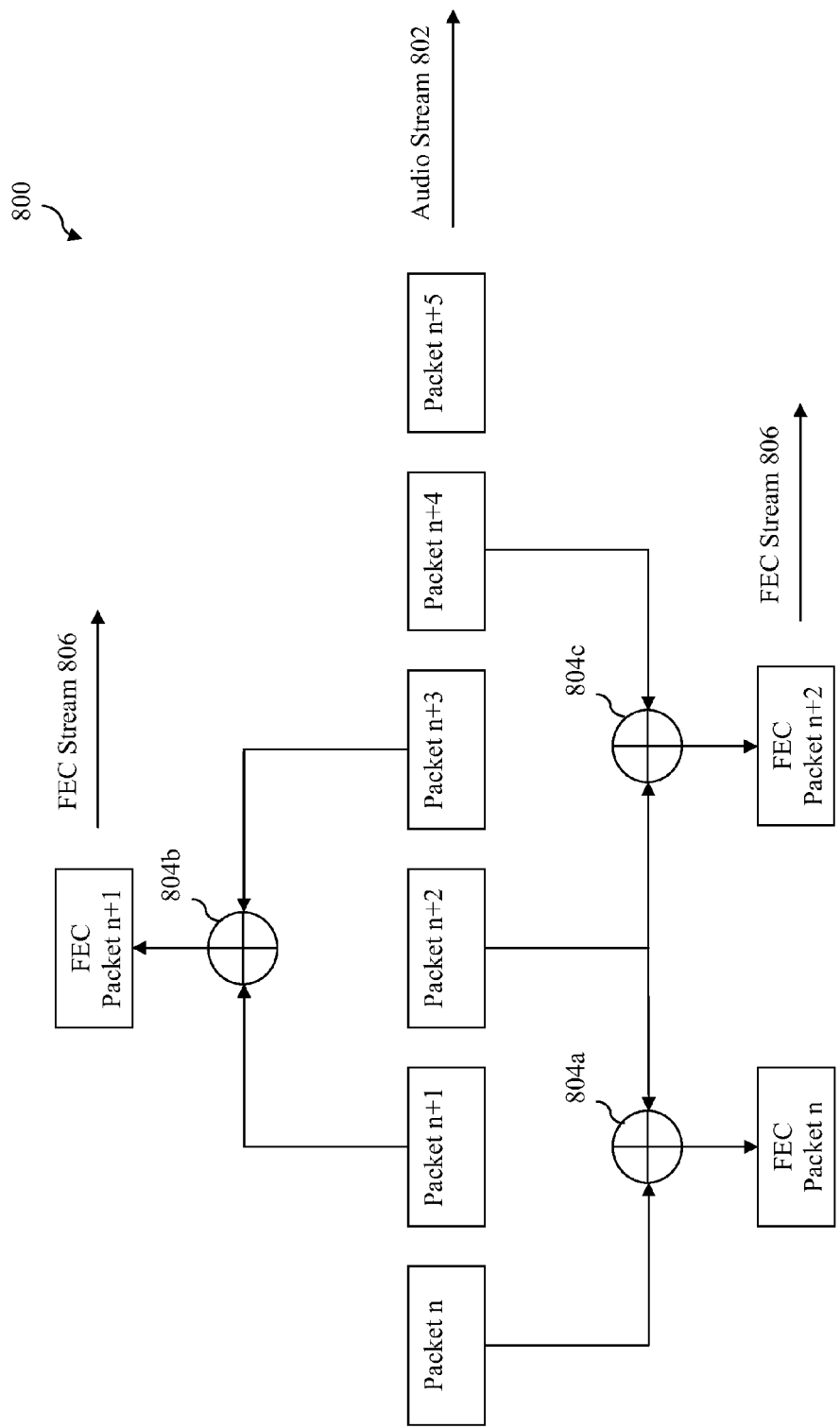
FIG. 8 is a diagram illustrating one method for performing an FEC encoding step of the flowchart of FIG. 7 in accordance with an embodiment of the present invention.

FIG. 8 is a diagram 800 illustrating one method by which recovery logic 604 of content sink 600 may perform the FEC encoding step 704 of flowchart 700. The FEC encoding method illustrated in FIG. 8 is similar to a type of FEC encoding described in Section 7.4 of the AVDTP specification for performing source-to-sink FEC at the AV transport layer. However, this FEC encoding is used to generate a sink-to-sink FEC stream.

As shown in FIG. 8, a series of audio packets (denoted Packet n, Packet n+1, . . . , Packet n+5) comprises a portion of an audio stream 802 received by content sink 600 from an audio source. Recovery logic 604 performs FEC encoding of the audio packets by performing a bitwise exclusive-or operation based on alternate pairs of audio packets to generate an FEC packet corresponding to each pair of audio packets. Thus, for example, a bitwise exclusive-or operation 804a is applied to Packet n and Packet n+2 to generate an FEC packet n. Likewise, a bitwise exclusive-or operation 804b is applied to Packet n+1 and Packet n+3 to generate an FEC packet n+1. Similarly, a bitwise exclusive-or operation 804c is applied to Packet n+2 and Packet n+4 to generate an FEC packet n+2. The generated FEC packets (FEC Packet n, FEC packet n+1 and FEC packet n+2) are transmitted to another audio sink as part of an FEC stream 806. This process is continually applied to subsequently-received audio packets to generate and transmit further FEC packets.

It is noted that although FIG. 8 suggests that a bitwise exclusive-or operation is performed directly on audio packets, the bitwise exclusive-or operation may actually be applied to bit strings that are derived from audio packets. For example, as described in IETF RFC 2733, each bit string may be derived by concatenating specific fields from an RTP header of an audio packet, appending the audio packet payload, and then padding with zeroes.

The FEC encoding approach illustrated in FIG. 8 is only one type of FEC encoding that may be performed in a manner similar to that described in Section 7.4 of the AVDTP specification. Other schemes may combine, for example, more than two audio packets to generate FEC packets or may combine consecutive instead of alternating audio packets to generate FEC packets.

In one embodiment, each FEC packet generated by recovery logic 604 includes a sequence number base N and a bitmask containing 24 bits encapsulated in an FEC packet header. The sequence number base N is set to a sequence number that is associated with and uniquely identifies the first of a series of audio packets protected by the FEC encoding scheme. If bit i in the bitmask is set to 1, then the audio packet with sequence number N+i was used to generate the FEC packet. By transmitting this information as part of each FEC packet, audio sink 600 can advantageously change the FEC encoding scheme on the fly and still provide the other audio sink with sufficient information to properly perform a corresponding FEC decoding function. In one embodiment, recovery logic 604 can adaptively increase the strength of the FEC encoding function responsive to an indication that the other audio sink has a degraded wireless connection to the audio source. This indication may comprise, for example, the identification of lost FEC packets in the reciprocal FEC stream received from the other audio sink.

Figure 9:
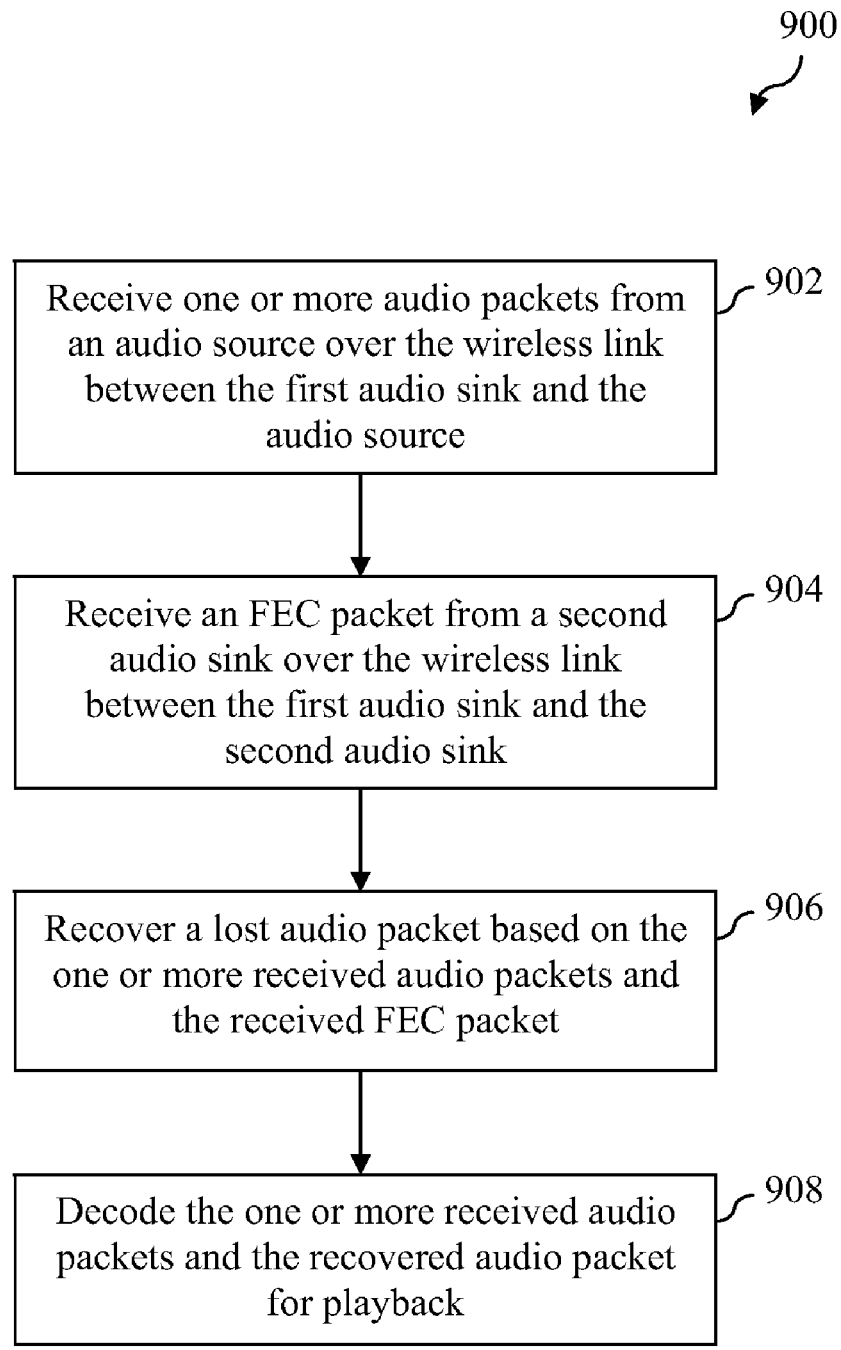
FIG. 9 depicts a flowchart of a method by which an audio sink in accordance with an embodiment of the present invention processes audio content for playback, wherein such processing includes the recovery of a packet lost in transmission from an audio source to the audio sink.

FIG. 9 depicts a flowchart of a method 900 by which audio sink 600 processes audio content for playback, wherein such processing includes the recovery of a packet lost in transmission from an audio source to audio sink 600. Although the method of flowchart 900 will be described with reference to the example audio sink 600 of FIG. 6, persons skilled in the relevant art(s) will appreciate that the method is not limited to that implementation.

As shown in FIG. 9, the method of flowchart 900 begins at step 902, in which wireless interface 602 of audio sink 600 receives one or more audio packets from an audio source over a wireless link between audio sink 600 (referred to in the context of flowchart 900 as "the first audio sink") and the audio source. In one embodiment, the wireless link comprises a Bluetooth™ wireless link and the one or more received audio packets comprise part of a logical end-to-end connection of streaming audio data between the audio source and audio sink 600.

At step 904, wireless interface 602 of audio sink 600 receives an FEC packet from another audio sink (referred to in the context of flowchart 900 as "the second audio sink") over a wireless link between audio sink 600 and the other audio sink. In an embodiment, this wireless link also comprises a Bluetooth™ wireless link and the received FEC packet is part of a stream of FEC packets transmitted from the other audio sink to audio sink 600. The other audio sink generates FEC packets by FEC encoding audio packets received from the audio source over a wireless link between the audio source and the other audio sink.

At step 906, recovery logic 604 of audio sink 600 determines that a packet has been lost in transmission from audio source to audio sink 600 and performs FEC decoding based on the one or more received audio packets and the received FEC packet to recover the lost audio packet. It is possible to use the FEC packet received from the other audio sink to recover packets lost in transmission from the audio source because the FEC packet is generated by the other audio sink by FEC encoding a copy of the same audio packets transmitted to audio sink 600. In other words, the other audio sink is FEC encoding essentially the same audio packet stream that is being received by audio sink 600, with the exception of alterations that may occur to that stream due to conditions on the different wireless links between the audio sinks and the audio source.

To perform step 906, recovery logic 604 is configured to match the received FEC packet to the one or more received audio packets for the purposes of performing FEC decoding. In one embodiment, recovery logic 604 is configured to perform this function by analyzing time stamps associated with the one or more received audio packets and the received FEC packet.

In an embodiment, the FEC decoding is of a type similar to that described in Section 7.4 of the AVDTP specification as mentioned above. One example of this type of FEC decoding as applied in an embodiment of the present invention will be described below in reference to FIG. 10. However, it is noted that the invention is not limited to this particular type of FEC decoding and other types of FEC decoding known to or subsequently developed by persons skilled in the relevant art(s) may also be used.

At step 908, audio decoding logic 606 decodes the one or more received audio packets and the recovered audio packet for playback via speaker 610. Various methods for decoding the content of audio packets to generate an audio signal for playback are well-known in the art and thus need not be described herein.

Figure 10:
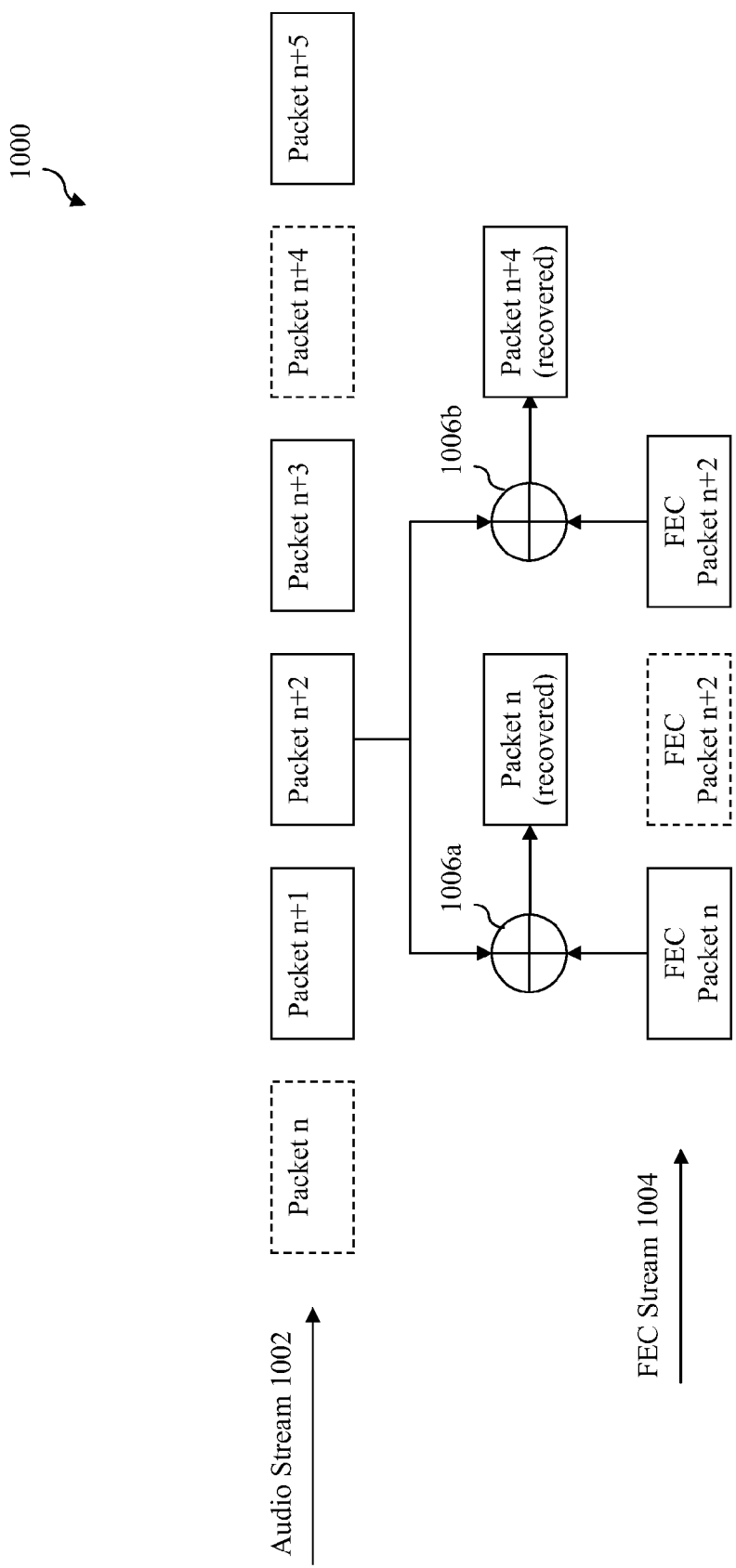
FIG. 10 is a diagram of one method for performing an FEC decoding step of the flowchart of FIG. 9 in accordance with an embodiment of the present invention.

FIG. 10 is a diagram 1000 illustrating one method by which recovery logic 604 of content sink 600 may perform the FEC decoding step 906 of flowchart 900. The FEC decoding method illustrated in FIG. 10 is similar to a type of FEC decoding described in Section 7.4 of the AVDTP specification for performing source-to-sink FEC at the AV transport layer. However, this FEC decoding is used to FEC decode a sink-to-sink FEC stream.

As shown in FIG. 10, a series of audio packets (denoted Packet n+1, Packet n+2, Packet n+3 and Packet n+5) comprises a portion of an audio stream 1002 received by content sink 600 from an audio source. Recovery logic 604 determines that two audio packets that should have been part of the series have been lost in transmission—namely Packet n and Packet n+4. To recover each of these lost audio packets, recovery logic 604 performs a bitwise exclusive-or operation on another audio packet in audio stream 1002 and an FEC packet associated therewith. The FEC packet is part of an FEC stream 1004 received from another audio sink. Thus, for example, a bitwise exclusive-or operation 1006a is applied to Packet n+2 and FEC Packet n to recover Packet n. Likewise, a bitwise exclusive-or operation 1006b is applied to Packet n+2 and FEC Packet n+2 to recover Packet n+4. The recovered audio packets are then merged with audio stream 1002 prior to delivery to audio decoding logic 606. This process is continually applied to recover additional audio packets lost in transmission from the audio source to audio sink 600.

It is noted that although FIG. 10 suggests that a bitwise exclusive-or operation is performed directly on audio and FEC packets, the bitwise exclusive-or operation may actually be applied to bit strings that are derived from such packets. Furthermore, the FEC decoding approach illustrated in FIG. 10 is only one type of FEC decoding that may be performed in a manner similar to that described in Section 7.4 of the AVDTP specification.

D. Use of Sink-Generated FEC Streams for Audio Playback Synchronization in Accordance with an Embodiment of the Present Invention The manner in which FEC packets are used to perform synchronization operations by first audio sink 504 and second audio sink 506 of system 500 will now be described in more detail. To facilitate this description, further reference will be made to the functional block diagram of example audio sink 600 provided by FIG. 6. As noted above, example audio sink 600 may represent either first audio sink 504 or second audio sink 506.

Figure 11:
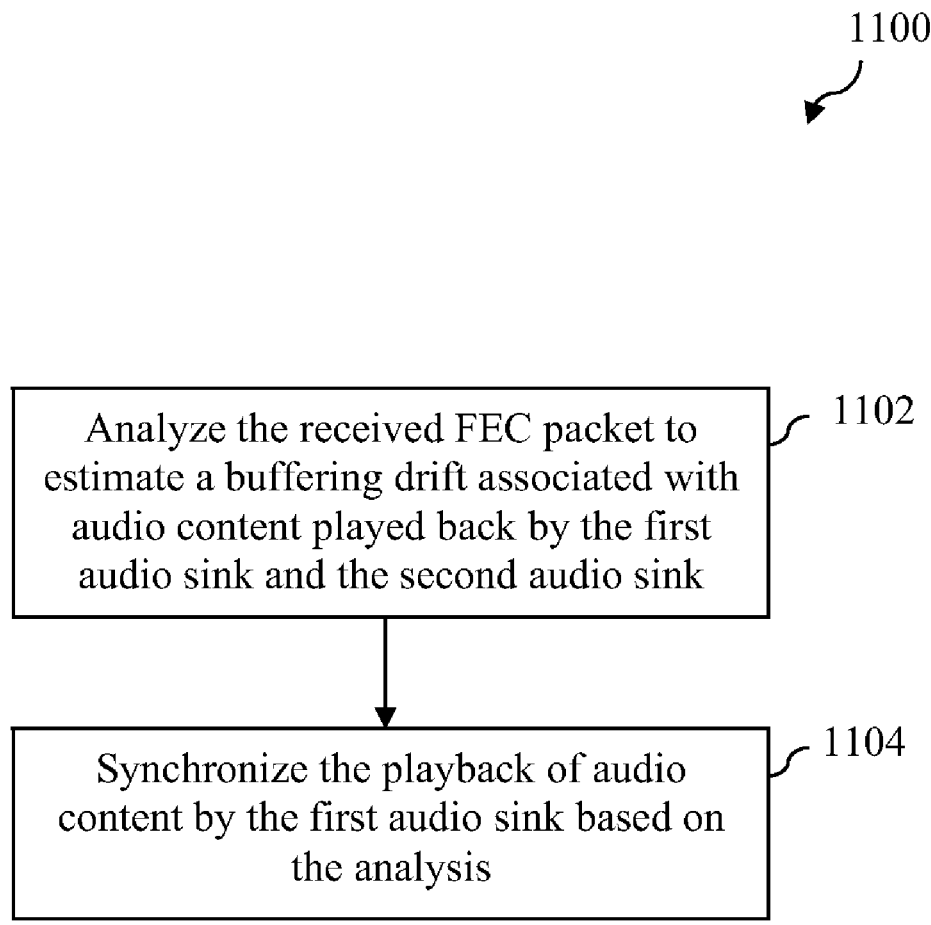
FIG. 11 depicts a flowchart of a method for synchronizing the playback of audio content by a first audio sink with the playback of audio content by a second content sink in accordance with an embodiment of the present invention.

FIG. 11 depicts a flowchart of a method 1100 by which audio sink 600 synchronizes playback of audio content with another audio sink, wherein both audio sink 600 and the other audio sink are receiving copies of the same audio content from the audio source over different wireless links. Although the method of flowchart 1100 will be described with reference to the example audio sink 600 of FIG. 6, persons skilled in the relevant art(s) will appreciate that the method is not limited to that implementation.

As shown in FIG. 11, the method of flowchart 1100 begins at step 1102, in which synchronization logic 608 of audio sink 600 analyzes a received FEC packet to estimate a buffering drift associated with audio content played back by audio sink 600 (referred to in the context of flowchart 1100 as "the first audio sink") and the other audio sink (referred to in the context of flowchart 1100 as "the second audio sink"). The received FEC packet was transmitted by the other audio sink, received by wireless interface 602, and passed to recovery logic 604 for use in performing FEC decoding operations in a manner previously described in reference to flowchart 900 of FIG. 9. In an embodiment, recovery logic 604 passes a copy of the received FEC packet to synchronization logic 608 to facilitate performance of step 1102.

To perform this analysis, synchronization logic 608 may compare a time stamp associated with the received FEC packet to time stamps associated with audio packets currently in queue for decoding and playback by audio decoding logic 606.

At step 1104, synchronization logic 608 synchronizes the playback of audio content by audio sink 600 with that of the other audio sink based on the analysis performed in step 1102. This step may comprise reducing the estimated buffering drift between the two audio sinks.

E. Conclusion

While various embodiments of the present invention have been described above, it should be understood that they have been presented by way of example only, and not limitation. It will be understood by those skilled in the relevant art(s) that various changes in form and details may be made to the embodiments of the present invention described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for processing audio content for playback in a first audio sink, comprising:
receiving one or more audio packets from an audio source over a first wireless link;
receiving a forward error correction (FEC) packet from a second audio sink, wherein the second audio sink generated the received FEC packet by FEC encoding a plurality of audio packets received from the audio source over a second wireless link;
recovering a lost audio packet based on the one or more received audio packets and the received FEC packet; and
decoding the one or more received audio packets and the recovered audio packet for playback.

2. The method of claim 1, wherein recovering a lost audio packet based on the one or more received audio packets and the received FEC packet comprises:
performing an exclusive-or operation based on the one or more received audio packets and the received FEC packet.

3. The method of claim 1, further comprising:
receiving a plurality of audio packets from the audio source over the first wireless link;
performing FEC encoding on the received plurality of audio packets to generate an FEC packet; and
transmitting the generated FEC packet to the second audio sink.

4. The method of claim 3, wherein performing FEC encoding on the received plurality of audio packets to generate a second FEC packet comprises:
performing an exclusive-or operation based on two or more packets within the received plurality of audio packets.

5. The method of claim 1, further comprising:
analyzing the received FEC packet to estimate a buffering drift associated with audio content played back by the first audio sink and the second audio sink; and
synchronizing the playback of audio content by the first audio sink based on the analysis.

6. The method of claim 5, wherein analyzing the received FEC packet to estimate a buffering drift associated with audio content played back by the first audio sink and the second audio sink comprises:
analyzing a time stamp associated with the received FEC packet.

7. The method of claim 1, wherein at least one of the first wireless link, and the second wireless link comprises a Bluetooth™ wireless link.

8. The method of claim 1, wherein at least one of the first wireless link and the second wireless link comprises an IEEE 802.11 wireless link.

9. An audio sink, comprising:
an interface configured to receive one or more audio packets from an audio source over a first wireless link and to receive a forward error correction (FEC) packet from an other audio sink, wherein the other audio sink generated the received FEC packet by encoding a plurality of audio packets received from the audio source over a second wireless link;
recovery logic communicatively connected to the interface, the recovery logic configured to recover a lost audio packet based on the one or more received audio packets and the received FEC packet; and
audio decoding logic communicatively connected to the recovery logic, the audio decoding logic configured to decode the one or more received audio packets and the recovered audio packet for playback.

10. The audio sink of claim 9, wherein the recovery logic is configured to recover the lost audio packet by performing an exclusive-or operation based on the one or more received audio packets and the received FEC packet.

11. The audio sink of claim 9, wherein the interface is further configured to receive a plurality of audio packets from the audio source over the first wireless link, wherein the recovery logic is further configured to perform FEC encoding on the received plurality of audio packets to generate an FEC packet, and wherein the interface is still further configured to transmit the generated FEC packet to the other audio sink.

12. The audio sink of claim 9, wherein the recovery logic is configured to perform FEC encoding on the received plurality of audio packets by performing an exclusive-or operation based on two or more packets within the received plurality of audio packets.

13. The audio sink of claim 9, further comprising:
synchronization logic communicatively connected to the recovery logic and the decoding logic, the synchronization logic configured to analyze the received FEC packet to estimate a buffering drift associated with audio content played back by the audio sink and the other audio sink and to synchronize the playback of audio content by the audio sink based on the analysis.

14. The audio sink of claim 13, wherein the synchronization logic is configured to analyze a time stamp associated with the received FEC packet to estimate the buffering drift.

15. A system, comprising:
   a first audio sink configured to receive a plurality of audio packets from an audio source over a first wireless link, to perform forward error correction (FEC) encoding on the plurality of audio packets to generate an FEC packet, to transmit the FEC packet, and to decode the plurality of audio packets for playback; and
   a second audio sink configured to receive one or more packets from the audio source over a second wireless link, to receive the FEC packet from the first audio sink, to recover a lost audio packet based on the one or more packets received from the audio source and the FEC packet, and to decode the one or more audio packets received from the audio source and the recovered audio packet for playback.

16. The system of claim 15, wherein the first audio sink is configured to perform FEC encoding on the plurality of audio packets by performing an exclusive-or operation based on two or more packets within the plurality of audio packets.

17. The system of claim 15, wherein the second audio sink is configured to recover the lost audio packet by performing an exclusive-or operation based on the one or more audio packets received from the audio source and the FEC packet.

18. The system of claim 15, wherein the second audio sink is configured to analyze the FEC packet to estimate a buffering drift associated with audio content played back by the first audio sink and the second audio sink and to synchronize the playback of audio content based on the analysis.

19. The system of claim 18, wherein the second audio sink is configured to analyze a time stamp associated with the FEC packet to estimate the buffering drift.

20. The system of claim 15, wherein at least one of the first wireless link and the second wireless link is a Bluetooth™ wireless link.

21. The system of claim 15, wherein at least one of the first wireless link and the second wireless link is an IEEE 802.11 wireless link.

* * * * *